United States Patent
Farrell et al.

(10) Patent No.: US 9,686,338 B1
(45) Date of Patent: Jun. 20, 2017

(54) STREAMING CONTENT ADJUSTMENT BASED ON CAMERA FEEDBACK

(71) Applicant: Amazon Technologies, Inc., Reno, NV (US)

(72) Inventors: Eugene Michael Farrell, Sammamish, WA (US); Nathan Bartholomew Thomas, Seattle, WA (US); Erik Jonathon Tellvik, Renton, WA (US); Deepak Suryanarayanan, Bellevue, WA (US)

(73) Assignee: Amazon Technologies, Inc., Reno, NV (US)

(*) Notice: Subject to any disclaimer, the term of this patent is extended or adjusted under 35 U.S.C. 154(b) by 246 days.

(21) Appl. No.: 14/523,654

(22) Filed: Oct. 24, 2014

(51) Int. Cl.
*G06F 15/16* (2006.01)
*H04L 29/06* (2006.01)

(52) U.S. Cl.
CPC .......... *H04L 65/602* (2013.01); *H04L 65/608* (2013.01)

(58) Field of Classification Search
CPC .... H04L 65/602; H04L 65/605; H04L 65/608
See application file for complete search history.

(56) References Cited

U.S. PATENT DOCUMENTS

| | | | |
|---|---|---|---|
| 8,706,860 B2 | 4/2014 | Trahan et al. | |
| 8,773,540 B2 | 7/2014 | Friend | |
| 8,806,517 B2 | 8/2014 | Petrovic et al. | |
| 2007/0018992 A1 | 1/2007 | Wong | |
| 2007/0115361 A1 | 5/2007 | Bolas et al. | |
| 2007/0143837 A1 | 6/2007 | Azeez et al. | |
| 2008/0270612 A1 | 10/2008 | Malakapalli et al. | |
| 2009/0235342 A1 | 9/2009 | Manion et al. | |
| 2010/0195825 A1 | 8/2010 | Cini | |
| 2011/0004680 A1 | 1/2011 | Ryman | |
| 2011/0283356 A1 | 11/2011 | Fly et al. | |
| 2012/0096271 A1 | 4/2012 | Ramarathinam et al. | |
| 2013/0024584 A1 | 1/2013 | Marcus | |

(Continued)

OTHER PUBLICATIONS

U.S. Appl. No. 14/161,428, filed Jan. 22, 2014, Deepak Suryanarayanan.

(Continued)

*Primary Examiner* — Jonathan Bui
(74) *Attorney, Agent, or Firm* — Robert C. Kowert; Meyertons, Hood, Kivlin, Kowert & Goetzel, P.C.

(57) ABSTRACT

A streaming source sends streaming content to a display device. A camera captures images of the display device playing the streaming content and/or a user's interaction with the display device along with the displayed response to the user's interaction. The captured content is analyzed to determine, for example, image quality characteristics of the displayed content, a user experience associated with the displayed content or whether the displayed content matches an expected outcome associated with testing input. Information determined from the analysis of the captured content may be used to adjust characteristics of the streaming content, such as streaming parameters at the streaming source or configuration of the display device. A testing system may analyze the captured content to evaluate performance of the streaming system. Results of the testing may be sent to a data store and/or used to mitigate a poor user experience such as poor image quality.

20 Claims, 12 Drawing Sheets

(56) References Cited

U.S. PATENT DOCUMENTS

| | | | |
|---|---|---|---|
| 2013/0096904 A1* | 4/2013 | Hui | H04L 65/605 |
| | | | 703/21 |
| 2013/0151706 A1 | 6/2013 | Henriquez et al. | |
| 2013/0219468 A1 | 8/2013 | Bell | |
| 2013/0311990 A1 | 11/2013 | Tang et al. | |
| 2014/0152773 A1 | 6/2014 | Ohba et al. | |
| 2015/0248462 A1* | 9/2015 | Theeten | G06F 17/30516 |
| | | | 707/688 |
| 2015/0350956 A1* | 12/2015 | Bell | H04M 15/8214 |
| | | | 455/405 |
| 2016/0006779 A1* | 1/2016 | Zhou | H04L 65/60 |
| | | | 709/231 |
| 2016/0048565 A1* | 2/2016 | Cammert | G06F 17/30516 |
| | | | 707/776 |
| 2016/0217328 A1* | 7/2016 | Yanai | G06K 9/22 |
| 2016/0226723 A1* | 8/2016 | Delattre | H04L 45/04 |

OTHER PUBLICATIONS

U.S. Appl. No. 13/928,283, filed Jun. 26, 2013, Deepak Suryanarayanan.

U.S. Appl. No. 14/283,179, filed May 20, 2014, Deepak Suryanarayanan.

Amazon CloudFront Developer Guide for API Version Nov. 11, 2013. Document updated Dec. 18, 2013, pp. 1-280.

\* cited by examiner

STREAMING CONTENT ADJUSTMENT BASED ON CAMERA FEEDBACK

BACKGROUND

Streaming services are responsible for presenting users with a high quality video experience. It can be difficult for streaming services to determine what kind of experience is actually being delivered because once the streamed content leaves the service provider's servers/network, the streaming service provider may not be in control of the stream. That is, the streaming provider may hand off the content stream to other networks that deliver the content stream on behalf of the streaming provider.

Additionally, the streaming provider cannot always control the device that is used to receive and display the streaming content. The receiving and display device can have a significant impact on the user's experience with regard to the streaming content. Systems that analyze the content on the video card do not always reflect the same experience that a user of the streaming display system observes, for various reasons. Information captured internally to the client device may not be characteristic of the human experience of the displayed content. Even when a streaming provider requires a particular application or particular configurations on the receiving device, many other factors may influence the customer's perceived video experience, sometimes in a negative way. However, the streaming provider may not have a way to know what the user's streaming experience is, other than to ask the user for feedback. Users may be subjective or may not have the expertise to explain their streaming experience in such a way that provides useful feedback that can be used to improve the system.

Figure 1:
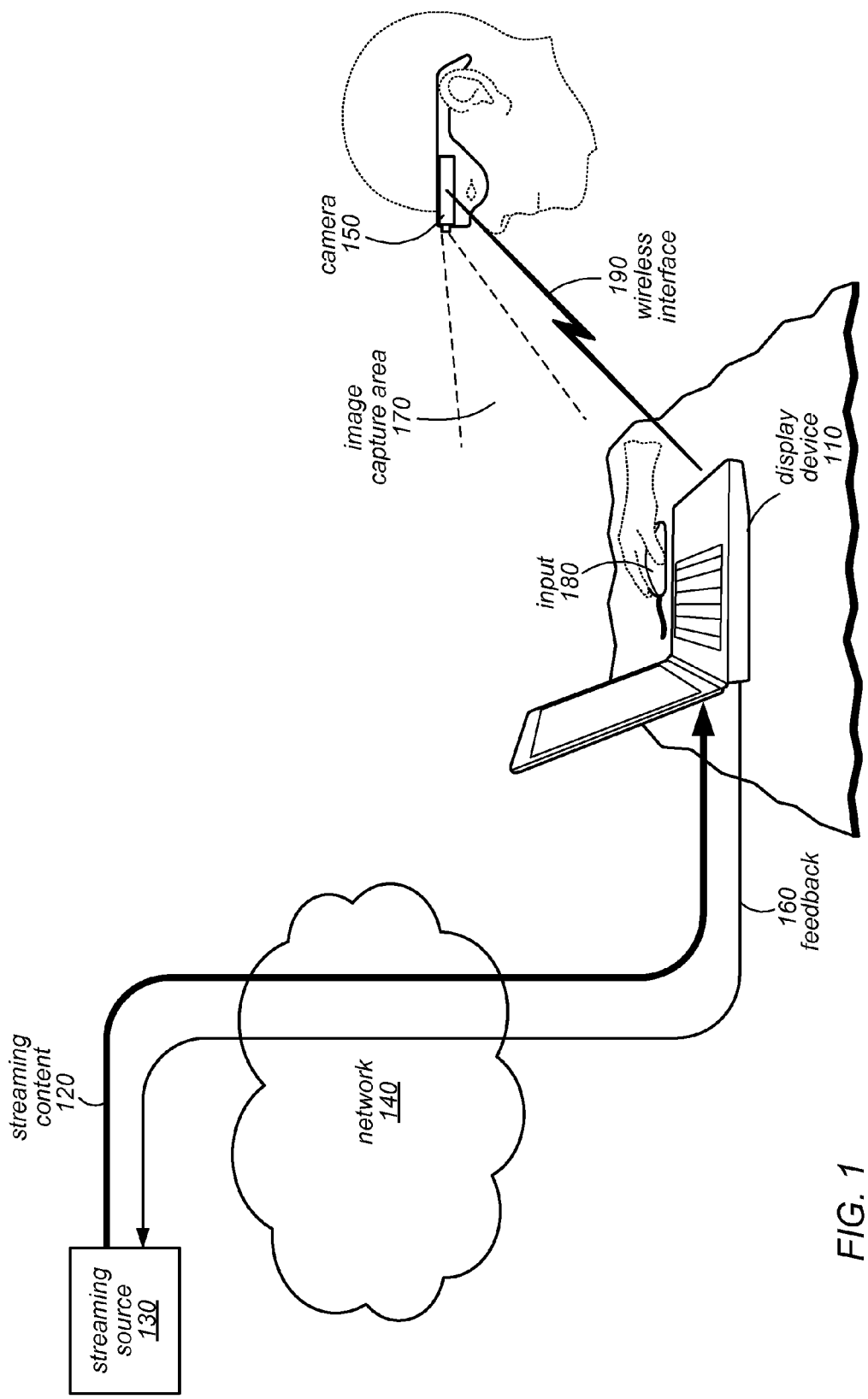
FIG. 1 illustrates a system for an improved streaming video experience using camera-based feedback, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a devices, systems and methods for adjusting streaming content based on camera-based feedback are disclosed. A video system may comprise a source device for streaming content (e.g., a streaming server of a streaming service provider), a display device for displaying the streamed content (e.g., a laptop, pad, smartphone, television, etc.) and a camera device. The camera device may be positioned such that the camera obtains or captures images of the streaming content being displayed by the display device. The images captured by the camera may be used to improve the streaming video experience of the user. For example, the captured images or video may be analyzed to determine characteristics of the captured video, such as the image quality experienced by the user. The determined characteristics may be used to improve the steaming video experience of the user, for example, adjustments may be made to the streaming source or to the configuration of the display device, based on analysis of the determined characteristics. Feedback may be sent from the display device (or from the camera) to the streaming source and the feedback may be used to determine the adjustments. In some embodiments, the feedback may include the adjustments or the content.

In some embodiments, the system may determine whether the determined characteristics indicate that adjustments to the streaming content are warranted and/or whether the adjustments are for the streaming source and/or for the display device. Instructions may be sent to either device, directing reconfiguration of the device, for example. Adjusted streaming content may be sent during or subsequent to the adjustments, sometimes in real-time with respect to the analysis of the captured content.

In some embodiments, the streaming content may include desktop streaming content. For example, a remote desktop service may stream an image of a computer desktop to the display device (e.g., a computer or laptop). The displayed streamed content may reflect input to the desktop, such as keyboard input, for instance.

In some embodiments, testing may be performed on the video system. For example, as part of a test, a user or a client-based testing application may be instructed to execute various inputs to the display device. The way the system responds may be analyzed to determine the quality of the user experience. For example, the user may be instructed to input a word via the keyboard. The desktop may receive the input word and may be updated such that the streamed content displays the word in response to the input. Analysis of the content may generate testing outcomes such as the perceived duration between receipt of the input and display of the updated desktop compared to an expected duration, for example. Such characteristics may be used to adjust parameters of the system, such as frame rate, for example.

FIG. 1 illustrates a system for an improved streaming video experience using camera-based feedback, according to some embodiments. The various illustrated elements of the system in FIG. 1 may perform all or portions of the methods and processes described herein (e.g., FIGS. 3, 4 and 7). Additionally, the various elements of the system in FIG. 1 may be arranged as illustrated in FIGS. 2A-2D, 5, 6A-6B and 8, or otherwise, in embodiments.

Any of various types of user interfaces may be incorporated into the devices described herein without departing from the scope of the disclosure. For example, various types of touch sensitive displays (e.g. resistive touchscreen panel displays, capacitive touchscreen panel displays, surface capacitance displays, etc.) or voice recognition interfaces may be used. In the illustrated example, display device 110 is a portable communications device (e.g., a laptop) with a display and input 180 (e.g., a mouse and keyboard). The display device may include hardware or software (e.g., a streaming content application) for receiving and displaying the streaming content. In some embodiments, the streaming content application may be configured to perform authorization and authentication functions associated with the streaming content. The streaming content application may be an off-the-shelf streaming application or a proprietary streaming application, in embodiments. The display application may be part of a web browser or a dedicated application (e.g., a virtual desktop client), in embodiments.

The streaming system illustrated in FIG. 1 includes streaming source 130. Streaming source 130 may include a streaming content service provider with a system or network of content servers for streaming content. In embodiments, the streaming source 130 may send or deliver streaming content via network 140 to display device 110 that may display the streaming content 120. In particular embodiments, the streaming source 130 is part of a virtual desktop infrastructure (VDI), and the streaming content 120 is transmitted using an appropriate VDI protocol (e.g., PCoIP (PC-over-IP), Remote Desktop Protocol (RDP), or another protocol).

Figure 8:
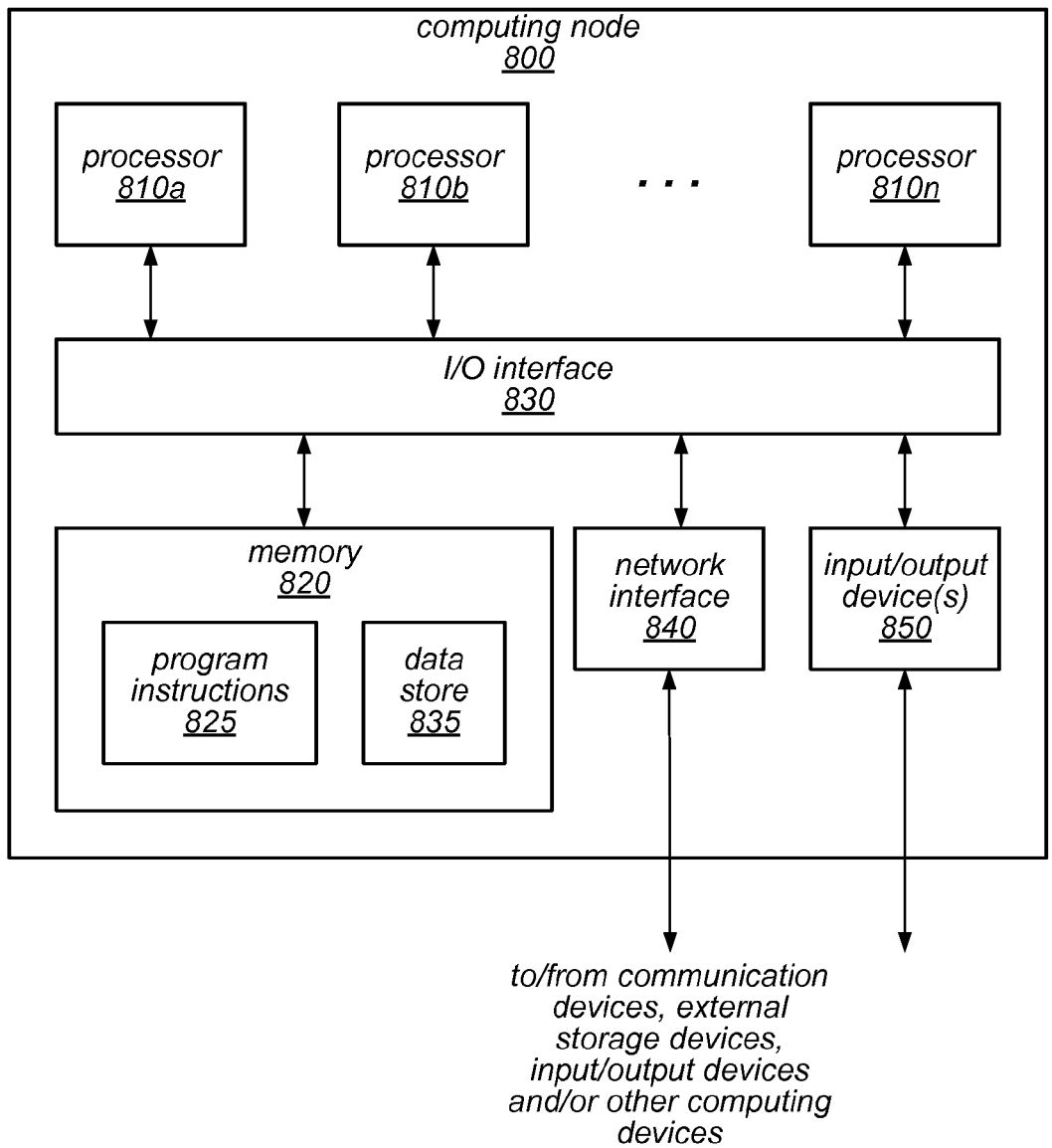
FIG. 8 is a block diagram illustrating an example computer system that implements some or all of the techniques described herein, according to different embodiments.

Network 140 may comprise any type of network including, but not limited to wired networks such as copper (e.g., plain old telephone (POTS)) or fiber optic networks, or wireless networks such as wireless personal area networks, local area networks, metropolitan area networks, wide area networks, cellular networks or global area networks (e.g., satellite-based networks). The streaming source 130 and the display device 110 may each include a network interface that may facilitate transfer of data (e.g., streaming content 120 or feedback 160) between the devices, as illustrated in FIG. 8 for example.

Camera 150 (e.g., a goggle or glasses-based camera) is illustrated with an image capture area 170. In embodiments, the camera 150 may capture images of the area in the direction the camera is pointed in. For example, in the illustrated embodiment, camera 150 is illustrated with an image capture area that includes the display of display device 110, input 180 (e.g., mouse and keyboard) portions of the user's body (e.g., the user's hand/arm) as well as portions of the work surfaces near to the display device. In some embodiments, the camera may be mounted otherwise, such as behind the user on a wall or ceiling or other surface such that the display, user and/or input devices may fall within the image capture area 170 of the camera.

In the illustrated embodiment, camera 150 is coupled to display device 110 via wireless interface 190. Wireless interface 190 may comprise any type of wireless interface technologies, in various embodiments. Some non-limiting examples include personal area networks such as Bluetooth, or local area networks. In some embodiments, wireless interface 190 may be replaced with a wired interface.

In the illustrated embodiment, the user may make a request via input 180 for streaming content 120 to be streamed to display device 110. The camera 150 may capture the input 180. The display device may send a request via network 140 to the streaming source for the content to be streamed. The streaming source 130 may receive the request and send the streaming content 120 to display device 110 over network 140. The display device 110 may display the requested content and the camera 150 may capture the displayed content. In embodiments, the camera may send the captured content to the display device via wireless interface 190. The display device 110 may analyze the captured content for characteristics (e.g., such as image quality characteristics or attributes) and send information associated with the characteristics to the streaming source 130 as feedback 160. The streaming source may receive the feedback, determine parameters of the streaming content that can be adjusted to alter the user experience, and instruct adjustment of the parameters such that the streaming content continues to be streamed to the display device, but in accordance with the adjusted parameters.

FIGS. 2A-2D illustrate various possible configurations of a streaming system, in accordance with the disclosed embodiments. Various elements of the illustrated streaming system may perform various portions of the processes described herein, for example, the processes illustrated in FIGS. 3, 4 and 7. Each of FIGS. 2A-2D includes streaming source 130, display device 110 and camera 150. In each of FIGS. 2A-2D the streaming source and the display device 110 are connected/coupled via network 140. In the illustrated embodiments, streaming source 130 sends a stream of streaming content to display device 110, that displays the streamed content and camera 150 captures images (e.g., video) of the display device 110 displaying the content. In some embodiments, the camera may send the content or information associated with the content directly to streaming source 130 (e.g., via a link to network 140 that avoids passing the captured content through display device 110).

FIGS. 2A-2D are illustrated with a content analysis module 220. The content analysis module 220 may be included in any of the illustrated components (e.g., camera 150, display device 110 or streaming source 130). The content analysis module 220 may be configured to perform various functions disclosed herein, including analyzing captured content. For example, content analysis module 220 may analyze captured content to determine characteristics of the content displayed by the display device. A non-exhaustive list of example characteristics includes resolution, frame rate, frame loss, color and/or other qualitative attributes. In some embodiments, content analysis module 220 may analyze the captured content to determine the quality of the video experience, by analyzing the captured video to determine the characteristics of the displayed video, for example. Low video quality or a poor user experience may be associated with characteristics that are associated with poor image quality, such as comparatively lower resolution than expected, a slower frame rate than expected, frame loss, poor color quality and the like, in some instances. The characteristics may be evaluated in real-time or near real-time with respect to the display of the streamed content, in some embodiments. The content analysis module 290 may be located elsewhere, such as in a cloud-based resource, in some embodiments.

FIGS. 2A-2D are also illustrated with streaming control module 230. The streaming control module may be configured to control the streaming of the content stream to the display device 110, in various embodiments. For example, the streaming control 230 may stream the content according to various parameters. A non-exhaustive list of example parameters includes resolution, frame rate, codec, video and/or audio data rate; other parameters are contemplated without departing from the scope of the invention. In some embodiments, the streaming control module 230 may receive instructions to adjust the parameters (e.g., from an adjustment engine 210) and implement the changes in accordance with the instructions. The streaming control module 230 may stop or start the content stream, based on instructions from the display device or from a testing system, for example. Streaming control 230 may implement the changes to the parameters (e.g., the streaming parameters) while the content continues to be streamed in some embodiments.

FIGS. 2A-2D are illustrated with adjustment engine 210. The adjustment engine 210 may be configured to determine adjustments to the parameters of the streaming content. In some embodiments, the adjustment engine 210 may determine the adjustments based on information received from the content analysis module 220. For example, the content analysis module 220 may analyze the captured content, determine that the video quality is low and send an indication of the low video quality (e.g., low resolution) to the adjustment engine 210. The adjustment engine may receive the indication of the low video quality, determine one or more adjustments that may be made (e.g., changing codecs or lowing frame rates) and instruct the streaming control to perform the adjustments to the streaming parameters. The adjustment engine may be located elsewhere, such as in a cloud-based resource, in some embodiments.

Figure 2A:
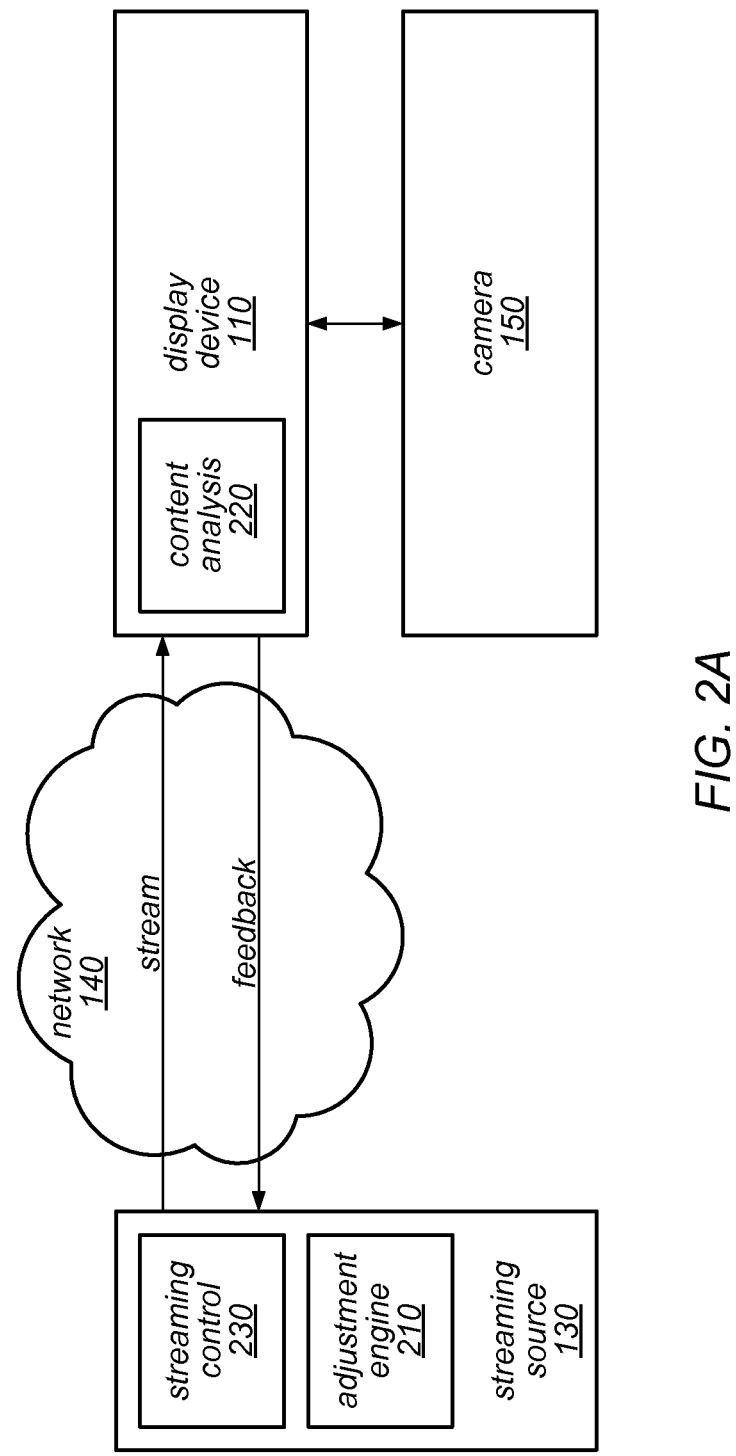
FIG. 2A is a block diagram of a system for an improved streaming video experience using camera-based feedback, according to some embodiments.

FIG. 2A is a block diagram of a system for an improved streaming video experience using camera-based feedback, according to some embodiments. In the illustrated embodiment, display device 110 is configured with the content analysis module 220 and the streaming source 130 is configured with the streaming control 230 and the adjustment engine 210. The display device receives the stream from streaming source 130 at the direction of streaming control 230 and displays the content, in the embodiment. Camera 150 captures the displayed content and sends the captured content to display device 110 where the content analysis module 220 analyzes the captured content to determine the characteristics of the captured content. Information associated with the characteristics is sent as feedback to the adjustment engine 210 at the streaming source 130 where adjustments to various parameters are determined, based on the information, and the adjustments are sent to the streaming control module 230 where the adjustments are implemented on the content stream being streamed, in various embodiments.

Figure 2B:
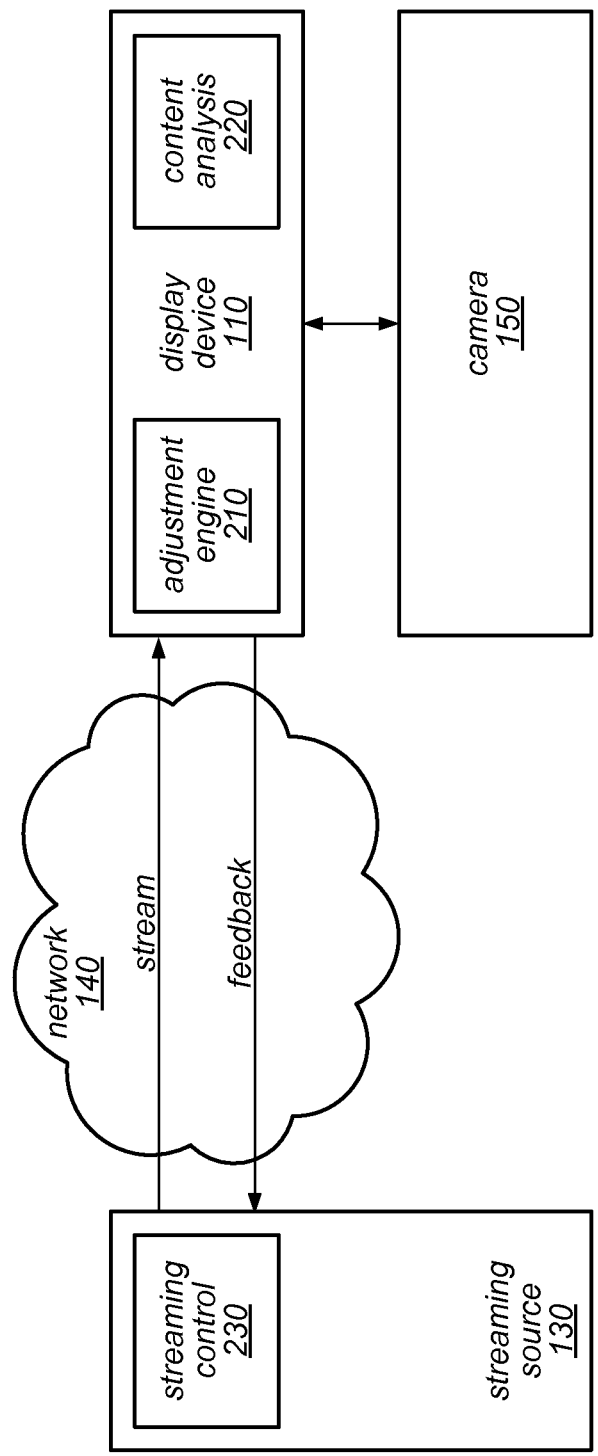
FIG. 2B is a block diagram of a system for an improved streaming video experience using camera-based feedback, according to some embodiments.

FIG. 2B is a block diagram of a system for an improved streaming video experience using camera-based feedback, according to some embodiments. The illustrated embodiment differs from FIG. 2A in that the display device 110 (instead of streaming source 130) is configured with the adjustment engine 210. In at least this embodiment, the content analysis module 220 would pass the information or characteristics to the adjustment engine 210 located on the same device instead of sending the information over the network 140. The adjustment engine 210 would then determine the adjustments, and send adjustment instructions as feedback across network 140 to the streaming control module 230 at the streaming source.

Figure 2C:
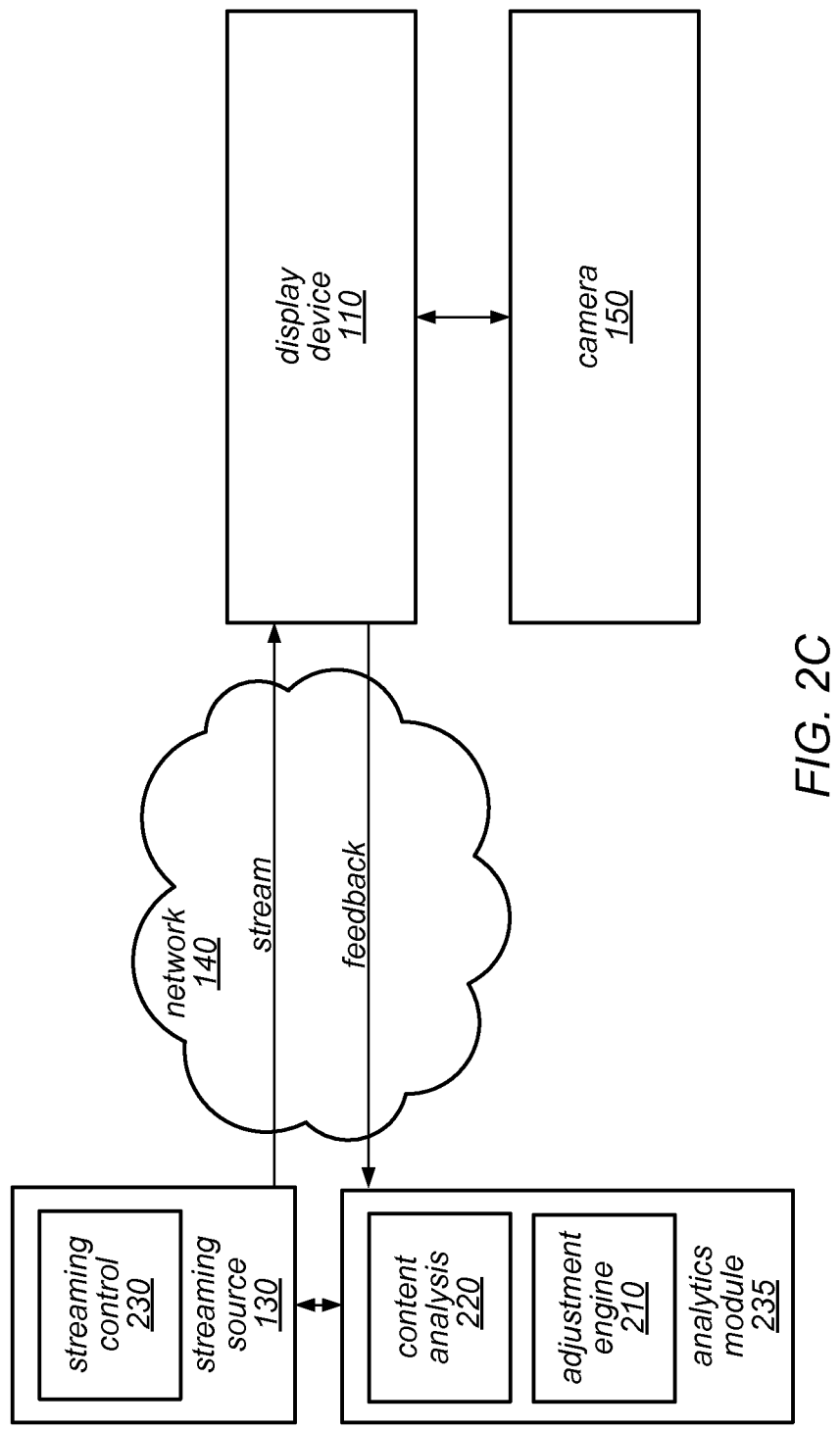
FIG. 2C is a block diagram of a system for an improved streaming video experience using camera-based feedback, according to some embodiments.

FIG. 2C is a block diagram of a system for an improved streaming video experience using camera-based feedback, according to some embodiments. In the illustrated embodiment, an analytics module 235 has been added to the system. The analytics module 235 is illustrated with content analysis module 220 and adjustment engine 210. In some instances, the streaming source 130 and the analytics module 235 may be configured as part of different resources in a cloud-based network or as part of different cloud-based networks. In some embodiments, the analytics module may be owned or controlled by a different entity from the entity that owns/controls the streaming source. For example, the streaming source 130 may be owned/controlled by a streaming content service provider and the analytics module may be owned/controlled by a third-party analytics provider. The analytics module 235 may communicate with the streaming source 130, in some embodiments.

In the illustrated embodiment, the analytics module 235 may also receive feedback from display device 110. In at least this embodiment, the feedback may include the captured video content, or some subset or portion of the captured video content, such as a frame or a subset of the frames from the captured video content, for example. The content analysis module 220 may perform analysis of the frames/content to determine characteristics of the displayed streaming content that was captured by the camera and pass information associated with the characteristics, or the characteristics to the adjustment engine. In some embodiments, the characteristics or information associated with the characteristics may be stored to a data store, (e.g., data store 835) located at the streaming source or co-located with the analytics module. The adjustment engine 210 may determine adjustments to the streaming source, (e.g., adjustments to streaming parameters) based on the characteristics or information and send the adjustments to the streaming source 130. In some embodiments, the adjustment engine 210 may store the adjustments to a data store (e.g., data store 835). The streaming control 230 may receive or obtain the adjustments and instruct the streaming source 130 to be reconfigured based on the adjustments, such that the streaming content is streamed in accordance with the adjustments, for example.

Figure 2D:
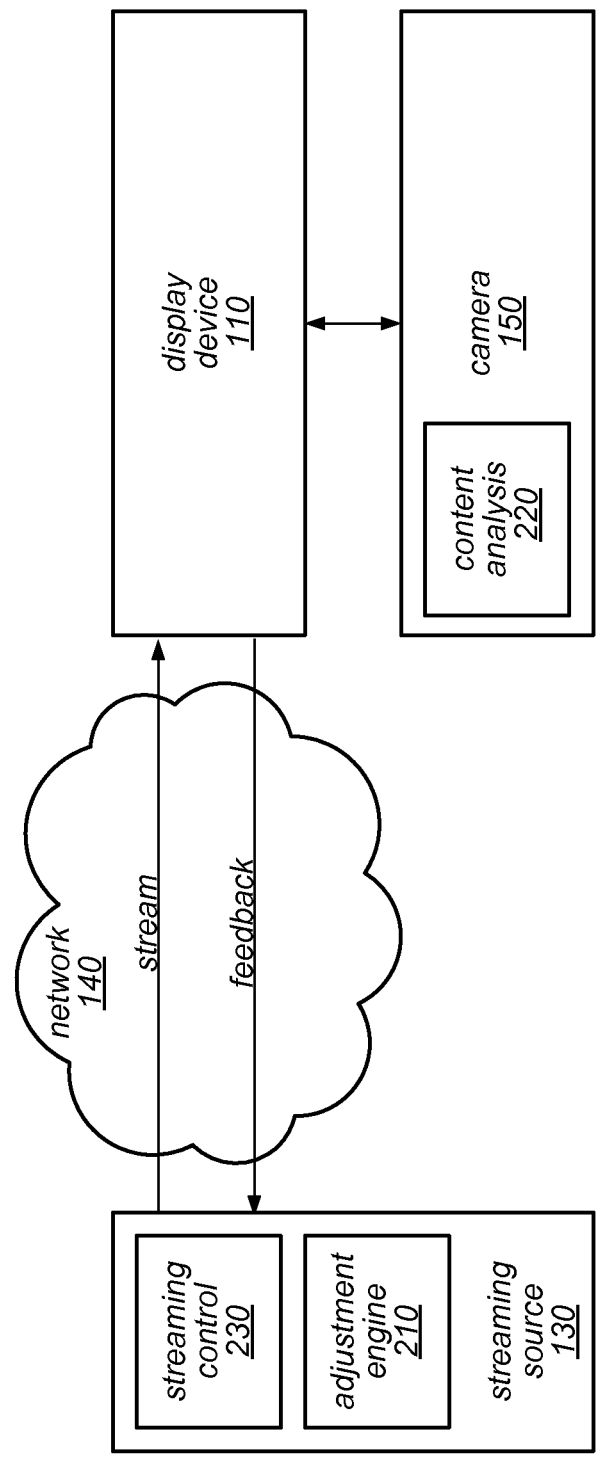
FIG. 2D is a block diagram of a system for an improved streaming video experience using camera-based feedback, according to some embodiments.

FIG. 2D is a block diagram of a system for an improved streaming video experience using camera-based feedback, according to some embodiments. In the illustrated embodiment, the camera 150 is configured with the content analysis module 220 and the streaming source is configured with the adjustment engine 210 and the streaming control 230. At least in this embodiment, the content analysis may be performed on the camera and the characteristics or information associated with the characteristics of the captured content may be sent to the display device 110 that sends passes the received information or characteristics to the streaming source as feedback. In some embodiments, the camera may send the captured content or results of the analysis directly to streaming source 130 via network 140 (e.g., via a network interface of camera 150 to network 140 (not illustrated)).

Figure 3:
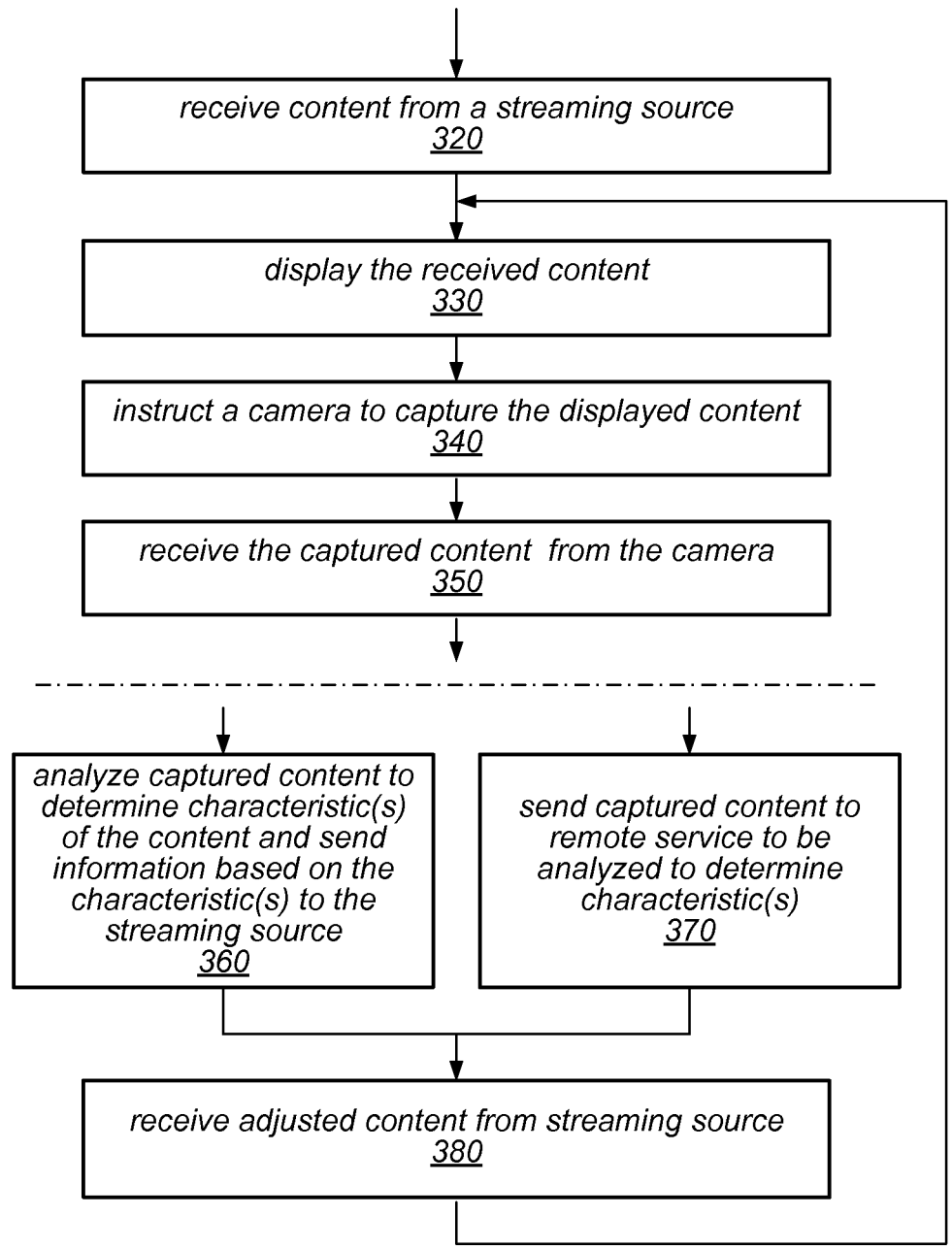
FIG. 3 is a flow diagram of an improved streaming video process using camera-based feedback, according to some embodiments.

FIG. 3 is a flow diagram of an improved streaming video process using camera-based feedback, according to some embodiments. The illustrated process may be performed by various elements of the systems illustrated in FIGS. 2A-2D, 5, 6A-6B and 8, in various embodiments. The lower half of the process illustrates alternative embodiments, as described below.

Content from a streaming source is received (block 320). For example, a display device (e.g., display device 110) may receive streamed content (e.g., 120) from a streaming source (e.g., 130). The content may be received in response to a request for the content from a display device or as instructed via a testing system, for example. The received content is displayed (block 330). For example, the display device 110 may display the content received from the streaming source 130. In some embodiments, the display device may display the received content via a streaming application. A camera may be instructed to capture the displayed content (block 340). For example, a testing system, the streaming source 130, or the display device 110 may instruct or request the camera to capture images (e.g., in the form of video or as still images) of the display device as the display device displays the streamed content.

The captured content may be received from the camera (block 350). For example, the camera 150 may send the content to the display device or to the streaming source directly. In one alternative embodiment, the captured content may be analyzed to determine characteristics of the content and send information based on the characteristics to the streaming source (block 360). For example, a content analysis module 220 may analyze the captured content and send information associated with the analysis to the streaming source 130. The characteristics may include image quality characteristics such as resolution, frame rate, frame loss, stalling, color, audio/video synchronization and/or other qualitative attributes, for example. Other characteristics may include session quality (initial buffering, re-buffering), in some embodiments. In some embodiments, adjustments (e.g., to the streaming parameters at the streaming source or to the display device) may be determined and the information (e.g., information based on the characteristics) that is sent to the streaming source may include the adjustments. The adjustments may be determined by an adjustment engine 210 located at the display device 120, for example.

In another alternative embodiment, the captured content may be sent to a remote service to be analyzed to determine the characteristics (block 370). For example, the captured content may be sent to a service remote from the display device or remote from the streaming source to be analyzed. In some instances, the captured content may be sent to the streaming source to be analyzed and the adjustment engine may determine adjustments to streaming parameters of the streaming source 130, based on the characteristics or based on the information associated with the characteristics. In other instances, adjustments to the display device may be determined, instructed and implemented based on the characteristics. For example, the display device may be instructed to use a different code, or the like.

Adjusted content may be received from the streaming source (block 380). For example, the streaming source may continue to send the streaming content in accordance with the determined adjustments and the display device 110 may receive the adjusted streaming content. In some embodiments, where the streaming source is left unchanged, but the display device is reconfigured according to the adjustments, the streaming content may continue to be received. The process may repeat continuously, be performed periodically, or be performed in response to user instruction, in various embodiments.

Figure 4:
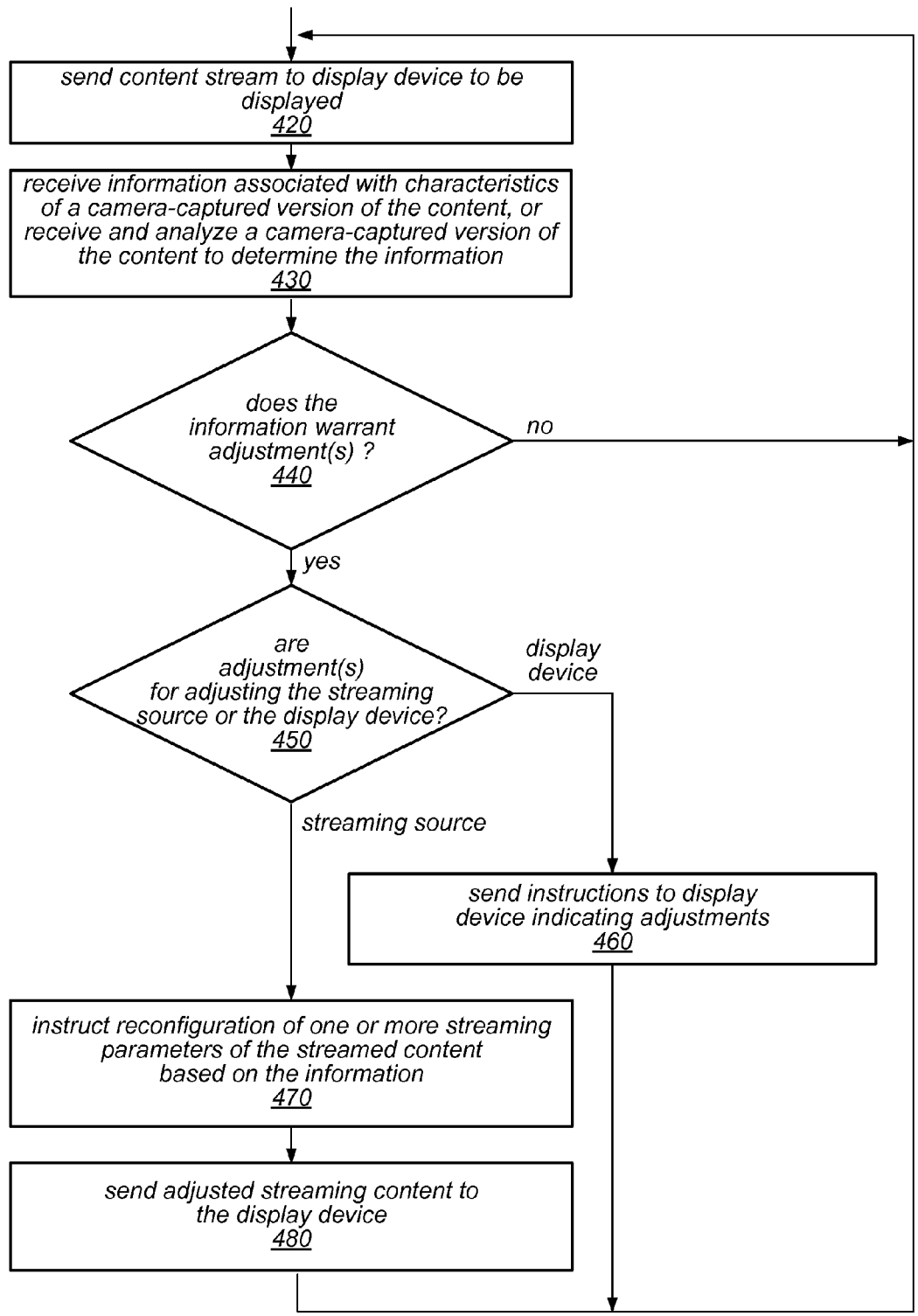
FIG. 4 illustrates a flow diagram of an improved streaming video process using camera-based feedback, according to some embodiments.

FIG. 4 illustrates a flow diagram of an improved streaming video process using camera-based feedback, according to some embodiments. The illustrated process may be performed by various elements of the systems illustrated in FIGS. 2A-2D, 5, 6A-6B and 8, in various embodiments. FIG. 4 expands upon the analysis and determinations illustrated in FIG. 3 and described above, in various embodiments.

A content stream is sent to a display device to be displayed (block 420). For example, streaming content is sent to display device 110 from a streaming source 130. The display device 110 displays the content, in various embodiments. Information associated with characteristics of the camera-captured version of the content may be received, or a camera-captured version of the streamed content may be received and analyzed to determine the information (block 430). For instance, a camera captures video of the display device displaying the streaming content and passes the captured content to the display device that sends the captured content to the streaming source for analysis, or the display device performs the analysis to determine characteristics of the captured content and sends the characteristics or information associated with the characteristics to the streaming source.

A determination may be made whether the information warrants adjustments (block 440). For example, adjustment engine 210 may receive the information and determine whether the characteristics of the captured content that are indicated by the information justify making adjustments to the streaming source or the display device. In some instances, if the information indicates that the captured content exhibits characteristics of poor image quality that can be improved by making adjustments, the adjustments may be warranted and the process may continue to block 450. In other instances, if the information indicates that the captured content does not exhibit characteristics of poor image quality, or if the characteristics of poor image quality cannot be improved by making adjustments, adjustment may not be warranted and the process may return to sending the content stream (block 420).

If adjustments are warranted, a determination may be made as to whether the adjustments are for adjusting the streaming source or the display device. For example, some characteristics of the captured content may indicate that image quality of the displayed streaming content may be improved by adjusting or reconfiguring the display device, changing the display resolution of the device, modifying the refresh rate, or adjusting the buffer, for example. In some instances, characteristics of the captured content may indicate that the image quality of the displayed streaming content may be improved by adjusting the streaming parameters at the streaming source, such as the frame rate, for example.

Instructions may be sent to the display device indicating the adjustments (block 460). For instance, the adjustment engine 210 may send instructions to the display device instructing the adjustments to the display device. The instructions may be received by the client streaming application and implemented automatically or the instructions may be displayed such that the user is instructed to perform the adjustments to the display device, in various embodiments.

When the adjustments are for the streaming source, reconfiguration of the one or more streaming parameters of the streamed content may be instructed, based on the information (block 470). For example, the adjustment engine 210 may send instructions to the streaming control 230 instructing adjustment of the streaming parameters and the streaming control may automatically implement the adjustments. In some embodiments the streaming control 230 may automatically implement the adjustments while continuing to stream the content. Adjusted streaming content may be sent to the display device (block 480). For example, the streaming source 130 may continue streaming or continue instructing streaming of the content via network 140, but in accordance with the implemented adjustments. The process may repeat continuously, be performed periodically, or be performed in response to user instruction, in various embodiments.

Example Provider Network Environments

This section describes example provider network environments in which embodiments of the methods described herein may be implemented. However, these example provider network environments are not intended to be limiting. In various embodiments, in these provider network environments, a service provider may host virtualized resource instances on behalf of a customer that can be accessed by end users. For example, end users who are associated with the customer on whose behalf the virtualized resources instances are hosted (e.g., members of the same organization or enterprise) may be able to access the virtualized resources instances using client applications on client devices. In some embodiments, the virtualized resources instances may be configured to implement virtual desktop instances for a virtual desktop infrastructure.

Figure 5:
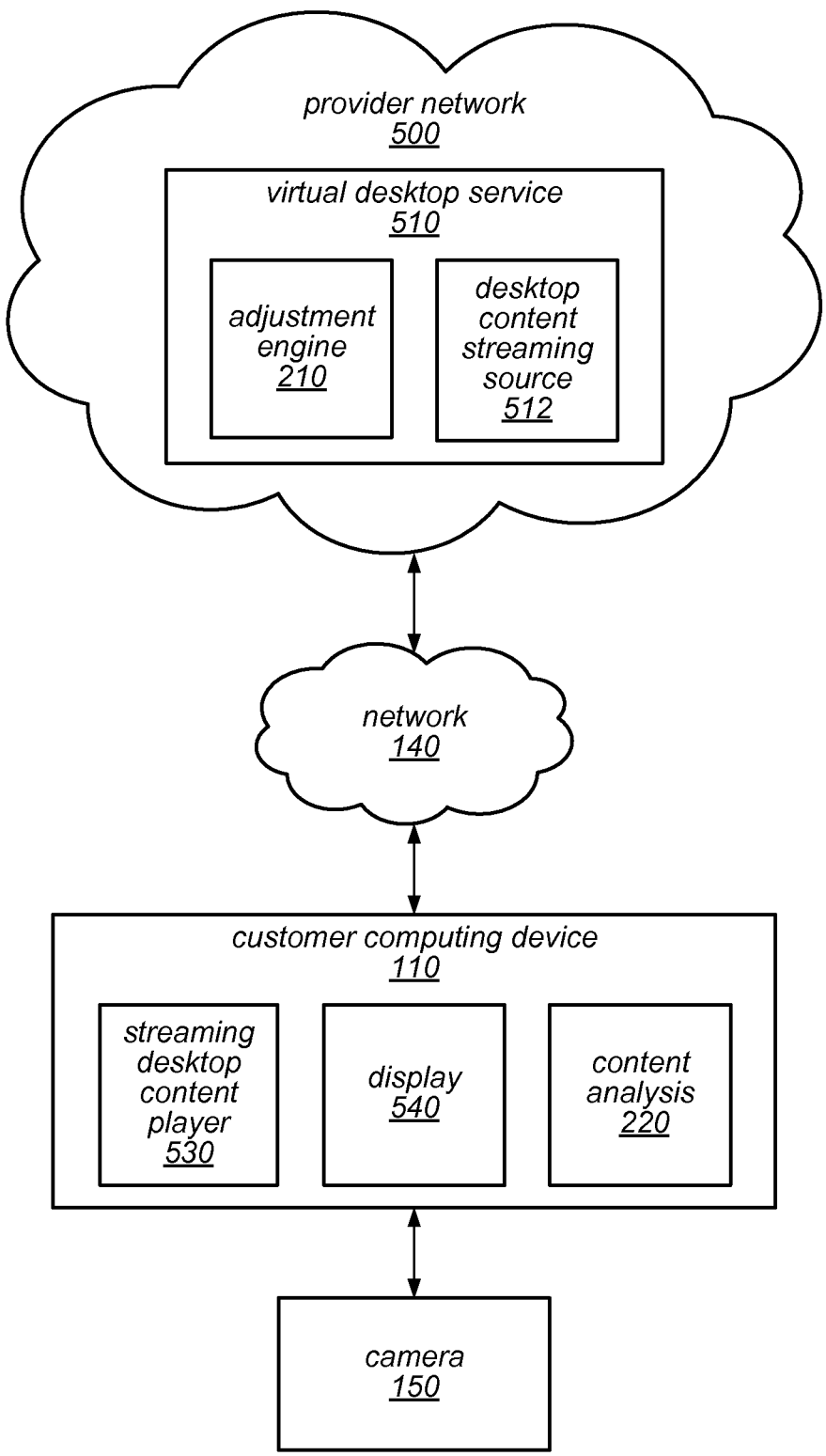
FIG. 5 illustrates a system diagram of a provider of virtualized computing resource connected to a customer of the virtualized computing resource that uses the virtualized computing resources, according to some embodiments.

FIG. 5 illustrates a system diagram of a provider of virtualized computing resource connected to a customer of the virtualized computing resource that uses the virtualized computing resources, according to some embodiments. The illustrated system may perform the processes illustrated in FIGS. 3, 4 and 7, in various embodiments.

Embodiments of various systems and methods for implementing virtualized computing resources are generally described herein in the context of a service provider that provides to customers, via an intermediate network such as the Internet, virtualized resources (e.g., virtualized computing and storage resources) implemented on a provider network of the service provider. In at least some embodiments, at least some of the resources provided to clients of the service provider via the provider network may be virtualized computing resources implemented on multi-tenant hardware that is shared with other customer(s) and/or on hardware dedicated to the particular customer. Each virtualized computing resource may be referred to as a resource instance. Resource instances may, for example, be rented or leased to clients of the service provider. For example, clients of the service provider may access one or more services of the provider network via APIs to the services to obtain and configure resource instances and to establish and manage virtual network configurations that include the resource instances, for example virtualized private networks.

In some embodiments, the resource instances may, for example, be implemented according to hardware virtualization technology that enables multiple operating systems to run concurrently on a host computer, i.e. as virtual machines (VMs) on the hosts. A hypervisor, or virtual machine monitor (VMM), on a host may present the VMs on the host with a virtual platform and monitors the execution of the VMs. Each VM may be provided with one or more private IP addresses; the VMM on a host may be aware of the private IP addresses of the VMs on the host. An example of a system that employs such a hardware virtualization technology is illustrated in FIG. 5 and described below.

A provider network 500 may provide a virtual desktop service 510 to customers or clients via one or more virtualization services that allow customers to purchase, rent, or otherwise obtain instances of virtualized resources, including but not limited to computation and storage resources, implemented on devices within the provider network or networks in one or more data centers.

In further embodiments, the virtual desktop service 510 may be configured with adjustment engine 210 and/or desktop streaming source 512, as illustrated. The virtual desktop server may be communicatively coupled via network 140 to a customer computing device 110. A customer computing device 110 may include a streaming desktop content player 530, display 540 and/or content analysis module 220, as illustrated.

In the illustrated embodiment, the streaming desktop content player 530 may request, via network 140, streaming content from provider network 500. The desktop content streaming source 512 may send the streaming desktop content to the streaming desktop content player 530 via the network 140 where the desktop content may be displayed via display 540. Camera 150 may capture video or still images of the content displayed on the display 540 and send the captured content to content analysis module 220. The content analysis module may analyze the content, determine characteristics associated with the displayed desktop content based on analysis of the captured content and send the characteristics or information associated with the characteristics as feedback to the provider network 500. The adjustment engine 210 may receive or obtain the characteristics or the information associated with the characteristics and determine whether and which adjustments should be made. For example, adjustments to streaming parameters at the streaming source 512 (e.g., frame rate) or to the customer computing device (e.g., resolution of the display, refresh rate). The adjustment engine 210 may instruct the desktop content streaming source 512 to adjust streaming parameters for the streaming content and the desktop content streaming source may continue streaming the desktop content in accordance with the adjusted parameters.

In some embodiments, adjustments to the streaming source or the display device may include adjustments based on analysis of the area outside the display but within the image capture area, for example, for adjusting the brightness of the screen or the contrast. For example, the content analysis may determine (e.g., based on analysis of the ambient lighting in the area around the display of display device 110 but within the image capture area 170) that the display is too bright or not bright enough (e.g., with respect to the surroundings) and notify the adjustment engine 210 of this characteristic of the captured content. The adjustment engine 210 may determine, (e.g., based on the notification from the content analysis module 220) that the configuration of the display device (e.g., brightness/contrast) can/should be adjusted and send instructions directing the adjustment.

Figure 6A:
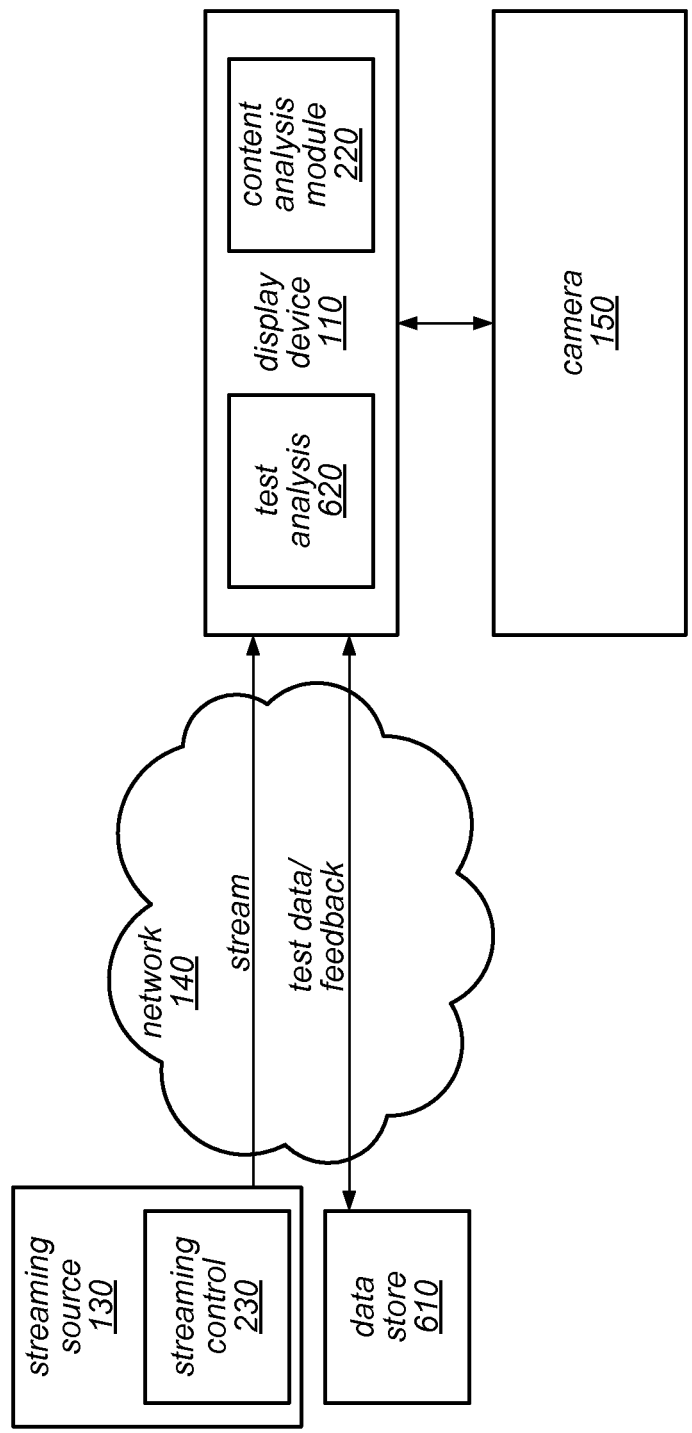
FIG. 6A is a block diagram of a system for an improved streaming video testing environment using camera-based feedback, according to some embodiments.
Figure 6B:
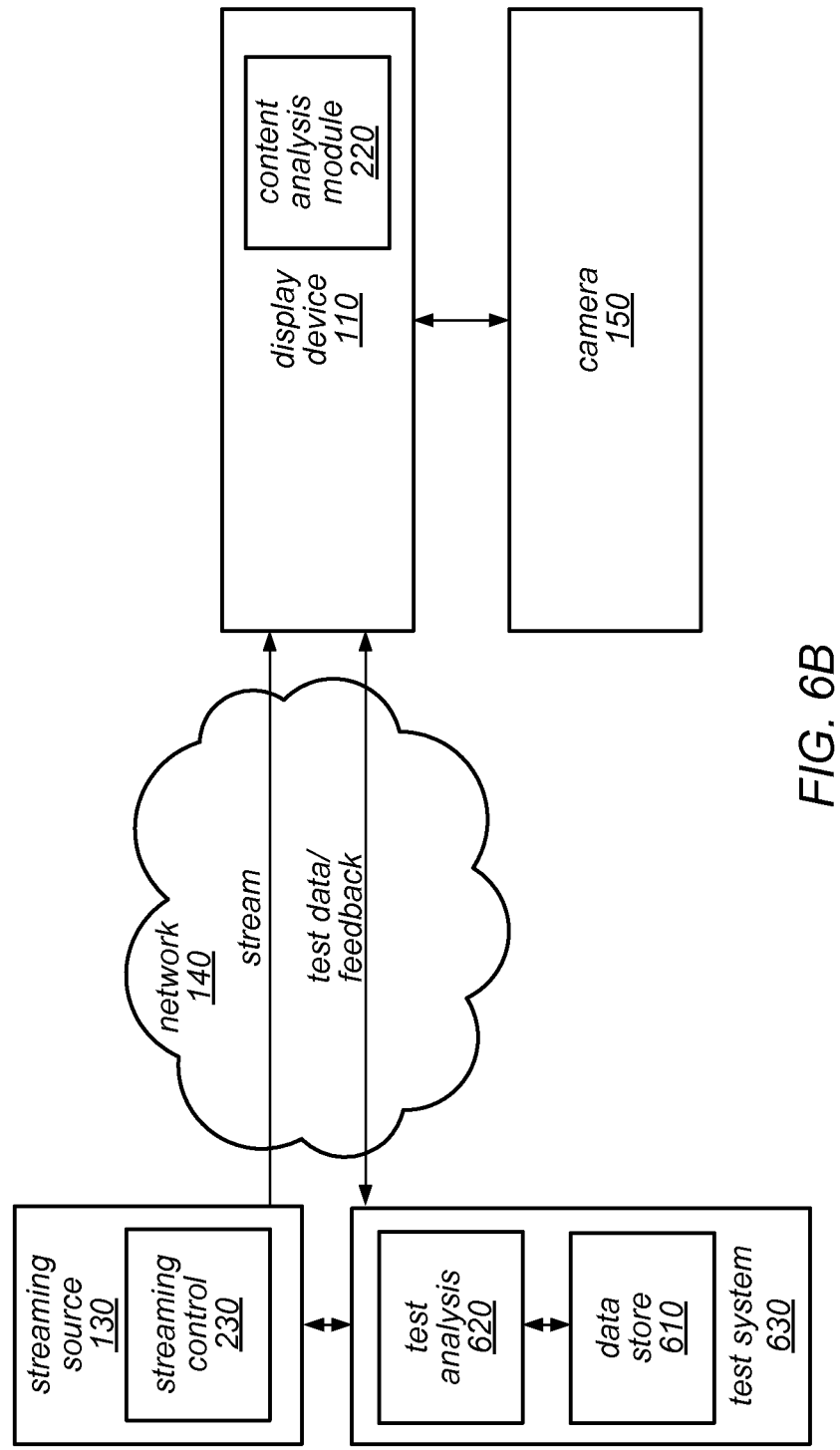
FIG. 6B is a block diagram of a system for an improved streaming video testing environment using camera-based feedback.

FIGS. 6A-6B illustrate systems for improved streaming video testing, according to embodiments. The systems illustrated in FIGS. 6A-6B may perform the processes disclosed herein, such as the process illustrated in FIG. 7, for example.

The systems illustrated in FIGS. 6A-6B illustrate a test analysis module 620. In some embodiments, the test analysis module 620 may compare captured content to expected content to determine an outcome of a test, for example. The test analysis module 620 may send test results as feedback to data store 610, as illustrated. Test data (e.g., test instructions) may be sourced from the data store 610 or from the data system 630, in various embodiments. Test data (e.g., test results) may be also be stored to data store 610. Data store 610 may be used to store various metrics associated with the characteristics of the captured video and/or the tests.

FIG. 6A is a block diagram of a system for an improved streaming video testing environment using camera-based feedback, according to some embodiments. Display device 110 is illustrated with content analysis module 220 and test analysis module 620 and is connectively coupled via network 140 to streaming source 130 that is configured with streaming control 230. In the illustrated embodiment, the display device is communicatively coupled via network 140 to data store 610. Data store 610 may be part of a third-party data store provider, distinct from the streaming source and the display device, as illustrated. In some embodiments, the streaming source 130 may be configured with the data store 610.

FIG. 6B is a block diagram of a system for an improved streaming video testing environment using camera-based feedback, where the test analysis module is configured as part of the test system 630. The test system 630 is illustrated as distinct from the streaming source 130, but may be part of the streaming source in other embodiments. The test system 630 may be provided by a third-party provider (e.g., a testing provider) in various embodiments. In the illustrated embodiment, streaming source 130 and test system 630 are communicatively coupled, via a network for example. In some embodiments, the streaming source 130 and test system 630 may be communicatively coupled via network 140 or another distinct network.

Figure 7:
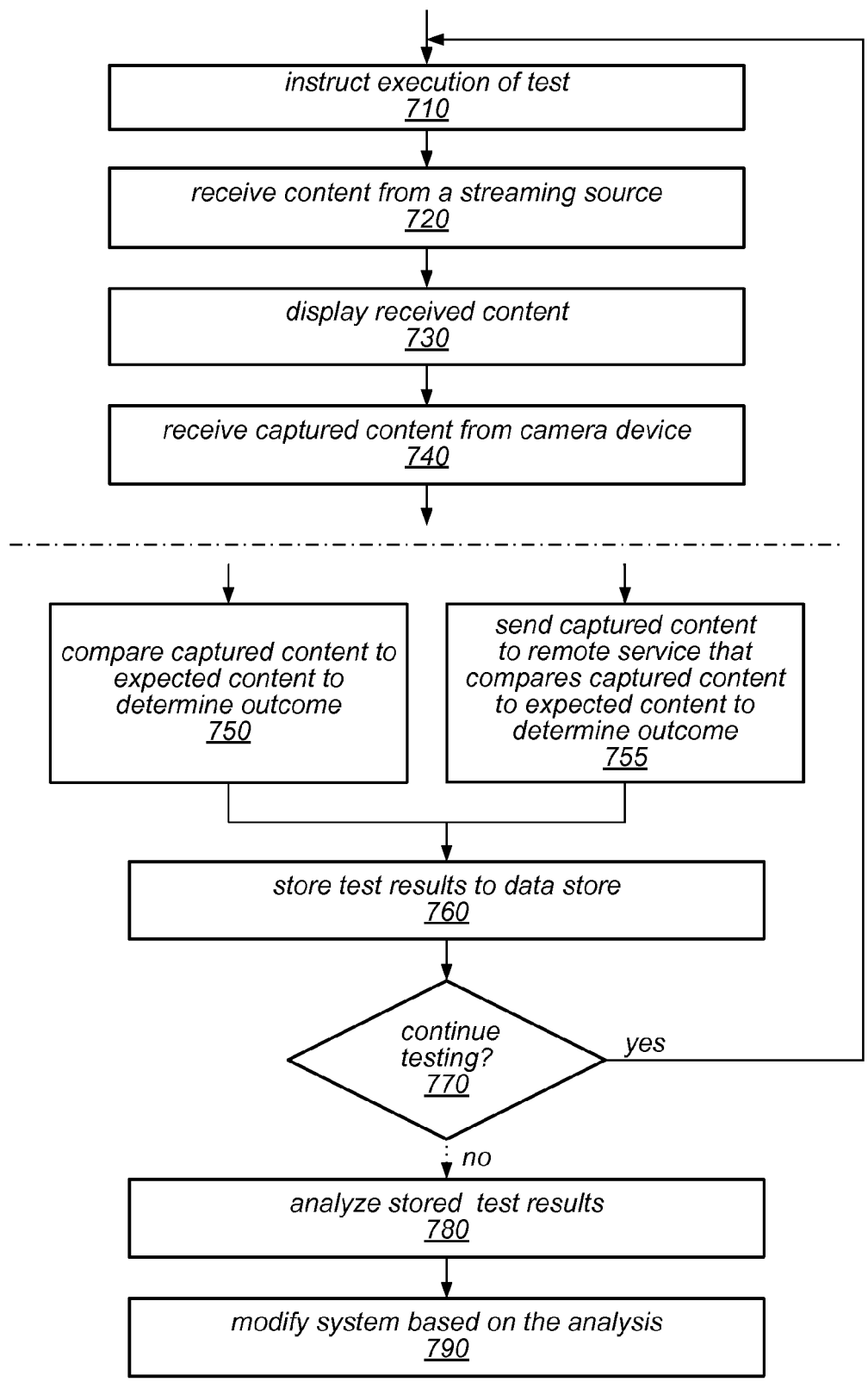
FIG. 7 is flow diagram of a process for an improved streaming video testing process, according to some embodiments.

FIG. 7 is flow diagram of a process for an improved streaming video testing process that may be performed by the systems illustrated in FIGS. 6A-6B, according to some embodiments. The middle section of FIG. 7 illustrates two alternative embodiments, as described below.

Execution of a test may be instructed (block 710). For example, a data store (e.g., 610) or a test system (e.g., 630) may store various tests (e.g., for example in a database) and execute various ones of the tests at the instruction of a user. In some embodiments, the testing instructions may be text instructions that are displayed to instruct a user at the display device to perform the test. In other embodiments, the testing instructions may be automated such that the test is automatically performed on behalf of a user. For example, the testing instructions may direct the streaming source to send the streaming content, direct the display to display the content, direct the camera to capture the displayed content and may analyze the testing results to determine an outcome of the test. In some embodiments, watermarks or the like may be used to signal testing procedures.

The content may be received from the streaming source (block 720) and displayed (block 730). For example, the display device may receive the streamed content sent by the streaming source 130 and the display device 110 may display the streamed content. Captured content may be received from a camera device (block 740). For instance, camera 150 may be directed to capture images of the display device 110 displaying the streamed content. In some embodiments, the captured content may include images or audio of the input devices used by the user of the display device to make inputs (e.g., testing inputs) into the display device. For example, the user may use a mouse or keyboard to provide input to a desktop displayed as part of the streaming content. For example, the camera may capture the sounds of keys being selected on the keyboard or clicks of the mouse that were directed by test instructions.

In one embodiment, the captured content may be compared to expected content to determine an outcome of the test (block 750). For example, the images or video captured by the camera 150 may be compared (e.g., by test analysis 620) to an expected outcome (e.g., an expected outcome stored as test data along with the test in data store 610). In some embodiments, characteristics of the captured content may be compared to expected characteristics associated with the test. Example outcomes may include a failed test when the captured images do not match the expected outcome or when the determined characteristics do not match the expected characteristics. The outcome may be stored in a data store (e.g., data store 610). In some embodiments, the outcome may be analyzed or used to determine modifications to the streaming system. The modifications may be carried out automatically, in some embodiments.

In another embodiment, captured content may be sent to a remote service that compares the captured content to expected content to determine an outcome (e.g., an outcome of the test). For example, the captured content may be sent to test system 630 (e.g., a system of a third-party testing service). In some embodiments, the testing system 630 may compare characteristics of the captured content to expected characteristics associated with the test to determine a test outcome and may store the test results to a data store (e.g., data store 610).

A determination may be made whether to continue testing (block 770). For example, the test system 630 or the test analysis module 620 may determine that the testing results are so poor that further testing is not warranted until modifications to the system are made, that all the tests have been performed, or that additional testing is needed. If further testing is needed, the process may return to instruct execution of a test (710) and so on. As described above, in particular embodiments, various processes disclosed herein may be performed in real-time with respect to one-another. In FIG. 7, the arrow from block 770 to block 780 is illustrated with a dotted line, instead of a solid line like the other. In some embodiments, the dotted line indicates that the operations described in blocks 780/790 may be performed later, instead of in real-time with respect at least some of the functionality described in blocks 720-770. In some embodiments, the operations described in blocks 780/790 may be performed in real-time with respect to some the functionality described in blocks 720-770, for example with respect to the storage of the test results in block 760 or with respect to the comparison described in block 750 in another example.

The stored test results may be analyzed (block 780). For example, a human operator may review the test results. The analysis may be used to identify various modifications that could be made to the system to improve the image quality/user experience. The system may be modified based on the analysis (block 790). For example, the client streaming application may be modified with an upgraded codec or the bandwidth of the network 140 may be upgraded, or the like.

In some embodiments, the test system 630 may be configured to communicate with the content analysis module 220 to determine when a user of the display device 110 uses a keyboard key or clicks a mouse by analyzing the captured content (e.g., based on the sound or movement). Such analysis may be used for quality assurance testing. For example, such analysis may be used to determine a lag time between when the user makes the input and when a corresponding update to the displayed desktop is displayed. Lag time can significantly erode a positive user experience, in embodiments. In some embodiments, the analysis performed by the test analysis module 620 may include using optical recognition techniques (e.g., motion-based or text-based), for example, recognizing when a user moves (e.g., moves to make input) or when the display screen is updated with the input text entered by the user of the display device.

In some embodiments, the systems described herein may be used as part of customer-service support. For example, a camera at a customer site may be used to capture images of the displayed content at the user site. The captured content may be sent to the customer service system for analysis by a customer service agent or may be analyzed by the client application on the customer's display device and the results of the analysis sent to the customer service system, for example. In some embodiments the results of the analysis may be displayed to the customer via the display device or the results of the analysis may automatically cause adjustments to the customer's display device or may automatically cause instructions for adjustments to streaming parameters at the streaming source. In some embodiments, artificial intelligence-based techniques may be used in the analysis of the content as well as in the testing analysis.

In some embodiments, the systems and process described herein may be used to provide security. For example, the captured content may be stored or analyzed for security purposes, such as monitoring misuse of the display device.

FIG. 8 is a block diagram illustrating an example computer system that implements some or all of the techniques described herein, according to different embodiments. In some embodiments, a device or system that implements the methods for adjusting streaming content based on camera-based feedback as described herein, may include a general-purpose computer system that includes or is configured to access one or more computer-accessible media, such as computer system 800 illustrated in FIG. 8. In the illustrated embodiment, computer system 800 includes one or more processors 810 coupled to a system memory 820 via an input/output (I/O) interface 830. Computer system 800 further includes a network interface 840 coupled to I/O interface 830.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, MIPS ISAs, RISC or any other suitable ISA, such as systems-on-chips (SoC). In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for adjusting streaming content based on camera-based feedback are shown stored within system memory 820 as program instructions 825 and data store 835.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network or networks, such as other computer systems or devices as illustrated in FIGS. 1 through 8, for example. In various embodiments, network interface 840 may support communication via any suitable wired or wireless general data networks, such as cellular networks, Ethernet networks, or Wi-Fi networks for example. Network interface 840 may support communication via telecommunications/telephony networks such as analog voice networks or digital fiber communications networks, via storage area networks such as Fiber Channel SANs, or via any other suitable type of network and/or protocol.

In some embodiments, system memory 820 may be one embodiment of a computer-accessible medium configured to store program instructions and data for implementing embodiments of systems, component and module that are configured to implement the methods for adjusting streaming content based on camera-based feedback as described above relative to FIGS. 1-8. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g.

SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the FIGs. and described herein represent exemplary embodiments of methods. The methods may be implemented in software, hardware, or a combination thereof. The order of method may be changed, and various elements may be added, reordered, combined, omitted, modified, etc.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

What is claimed is:

1. A system, comprising:
   a display device configured to:
      receive a streaming content from a streaming source; and
      display the received content; and
   a camera configured to:
      capture the displayed content; and
      send the captured content to the display device;
   wherein the display device is configured to:
      send the captured content to the streaming source to be analyzed for determining one or more adjustments to the streaming content to produce adjusted streaming content, or
      analyze the captured content to determine information for one or more configuration changes and send the information to the streaming source for determining one or more adjustments to the streaming content to produce adjusted streaming content; and
   wherein the display device is further configured to receive the adjusted streaming content from the streaming source.

2. The system of claim 1, wherein the display device is configured to perform the analysis of the captured content.

3. The system of claim 2, wherein the display device comprises an adjustment engine that performs the determining of the one or more adjustments, and wherein the determined one or more adjustments are sent to the streaming source by the display device.

4. The system of claim 1, wherein the camera is configured to perform the analysis of the captured content.

5. The system of claim 1, wherein the display device is further configured to:
   receive instructions from the streaming source, the instructions directing reconfiguration of the display device, wherein the instructions are based at least in part on the analysis of the captured content; and
   execute the directed reconfiguration while displaying the received streaming content.

6. A method, comprising:
   performing, by one or more computing devices:
      sending streaming content to a display device;
      receiving information associated with characteristics of a camera-captured version of the streaming content captured from a display on the display device wherein the camera-captured version is captured as the display device displays the streaming content, or receiving and analyzing the camera-captured version of the streaming content and determining the information; and
      determining a mitigating response to the information.

7. The method of claim 6, wherein said determining the mitigating response comprises:
   determining one or more adjustments for the streaming source based on the information; and
   instructing the streaming source to implement the one or more adjustments.

8. The method of claim 7, further comprising:
   sending, to the display device, adjusted streaming content that has been adjusted based at least in part on one of the determined one or more adjustments to the streamed content.

9. The method of claim 7,
   wherein said determining the mitigating response further comprises determining that the one or more adjustments are for a reconfiguration of the display device; and
   wherein the method further comprises:
      sending, to the display device, instructions directing the reconfiguration of the display device based at least in part on the determined one or more adjustments.

10. The method of claim 6, further comprising:
    receiving, by a streaming source, the captured content such that the analyzing the camera-captured version of the streaming content and the determining the information associated with the characteristics of the camera-captured version of the streaming content is performed by the streaming source.

11. The method of claim 6, wherein said analyzing the camera-captured version of the streaming content and determining the information comprises:
    analyzing at least one of resolution, frame rate, frame loss, color attribute or audio attribute of the camera-captured version of the streaming content; and
    determining, based on the analysis, one or more adjustments to one or more streaming parameters comprising at least one of frame rate, codec, resolution, video data rate, or audio data rate.

12. The method of claim 6, further comprising:
    instructing execution of a test, the test comprising testing input that causes one or more changes to the streaming content displayed by the display device;
    wherein said analyzing the camera-captured version of the streaming content and determining the information comprises determining one or more testing outcomes in response to the test execution.

13. The method of claim 12, wherein said determining one or more testing outcomes in response to the test execution comprises determining the one or more testing outcomes based upon analysis of one or more criteria comprising variation in video of the camera-captured version of the streaming content, lack of variation in the video of the camera-captured version of the streaming content, artifacts in the video of the camera-captured version of the streaming content, or a fault or latency in the camera-captured version of the streaming content.

14. The method of claim 13,
wherein said determining the mitigating response to the information comprises determining one or more adjustments to a streaming video system based on the one or more testing outcomes; and
the method further comprising causing the one or more adjustments to the streaming video system.

15. A non-transitory computer-readable medium storing program instructions that are executed by one or more processors to implement:
a content analysis module configured to:
receive information for a camera-captured version of streamed content that was captured from a display device, wherein the camera-captured version is captured as the display device displays the streamed content; and
an adjustment engine configured to:
determine one or more adjustments to the streamed content based on analysis of the received information for the camera-captured version of the streamed content; and
instruct reconfiguration of a streaming source for the streamed content in accordance with the one or more adjustments.

16. The non-transitory computer-readable medium of claim 15,
wherein the analysis of the received information associated with the camera-captured version of the streamed content comprises analysis of at least one of resolution, frame rate, frame loss, color attribute or audio attribute of the captured version of the streamed content; and
wherein the one or more adjustments comprise adjustments to at least one of frame rate, codec, resolution, video data rate, or audio data rate of the streaming content.

17. The non-transitory computer-readable medium of claim 15, wherein the program instructions are further executed by the one or more processors to:
determine one or more adjustments to the display device based on analysis of the received information for the camera-captured version of the streamed content; and
send a message to the display device indicating the one or more adjustments to the display device.

18. The non-transitory computer-readable medium of claim 15,
wherein the streamed content comprises images for a virtual desktop session; and
wherein the program instructions are further executed by the one or more processors to:
receive an indication of input received at the display device, the input associated with the virtual desktop session;
alter the images for the virtual desktop session in accordance with the received input; and
send the altered images for the virtual desktop session as the streamed content such that the images displayed on the display device based on the streamed content are responsive to input to the display device.

19. The non-transitory computer-readable medium of claim 18, wherein the program instructions are further executed by the one or more processors to:
instruct execution of a test for the virtual desktop session, the test comprising instructing a user to provide testing input that causes one or more changes to the streamed content displayed by the display device;
wherein to perform said analysis of the received information for the camera-captured version of the streamed content, the streaming source is configured to compare an expected change to streamed content that is associated with the test to an actual change in the streamed content to determine a test outcome; and
store the test outcome to a data store.

20. The non-transitory computer-readable medium of claim 15, wherein the adjustment engine is further configured to:
determine one or more adjustments to the display device based on analysis of a light level outside of a display area of the display device and shown in the camera-captured version of the streamed content; and
send instructions directing the display device to be configured in accordance with the one or more adjustments to the display device.

* * * * *